United States Patent [19]

Lauwers

[11] Patent Number: 4,473,388
[45] Date of Patent: Sep. 25, 1984

[54] PROCESS FOR MELTING GLASS
[75] Inventor: Eddy J. Lauwers, Kalmthout, Belgium
[73] Assignee: Union Carbide Corporation, Danbury, Conn.
[21] Appl. No.: 463,955
[22] Filed: Feb. 4, 1983
[51] Int. Cl.³ .............................................. C03B 5/16
[52] U.S. Cl. ...................................... 65/134; 65/135; 432/20
[58] Field of Search ................. 65/136, 135, 134, 347, 65/346; 432/19, 20

[56] References Cited
U.S. PATENT DOCUMENTS

| 1,964,544 | 6/1934 | Trinks ..................................... | 432/20 |
| 3,592,623 | 7/1971 | Shepherd ............................. | 65/136 |
| 3,856,496 | 12/1974 | Nesbitt et al. .......................... | 65/136 |

FOREIGN PATENT DOCUMENTS

| 3233745 | 4/1969 | U.S.S.R. ................................ | 65/136 |
| 610803 | 6/1978 | U.S.S.R. ................................ | 65/135 |

OTHER PUBLICATIONS

PCT Publication WO82/04246, Erickson et al., Dec. 1982.

Primary Examiner—William Smith
Assistant Examiner—Michael K. Boyer
Attorney, Agent, or Firm—Saul R. Bresch

[57] ABSTRACT

In a process for melting glass in a furnace adapted therefor, said furnace having an upstream melting zone and a downstream fining zone, wherein the molten glass travels along a path from the melting zone to the fining zone comprising:
(a) introducing solid glass batch into the melting zone;
(b) heating the batch whereby an upper layer of batch and a lower layer of molten glass are formed in the melting zone;
(c) providing sufficient heat to maintain the molten glass in the molten state through the fining zone;
(d) providing at least a part of the process heat through at least one oxygen/fuel flame located at each side of the path of the molten glass, said flames being fueled by an oxygen containing gas/fuel mixture wherein the oxygen containing gas contains about 50 percent to about 100 percent oxygen by volume; and
(e) withdrawing the molten glass from the fining zone, the improvement comprising:
(i) providing the oxygen/fuel flames at low momentum;
(ii) directing the tip of each flame at the interface of the solid glass batch and the molten glass; and
(iii) covering substantially all of the width of the furnace with the flames in a narrow band about perpendicular to the path of the molten glass, said narrow band straddling the point at which the tips of the flames meet the interface in step (ii).

3 Claims, 2 Drawing Figures

PROCESS FOR MELTING GLASS

TECHNICAL FIELD

This invention relates to a process for melting and refining glass in a furnace.

BACKGROUND ART

Conventional glass melting and refining furnaces of the non-rotary type are found in the general shape of a rectangular prism having a melting zone and a fining zone. The furnaces are heated by a multiplicity of air/fuel burners symmetrically placed on either side of, and above, the path of the molten glass, which flows from the melting zone to the fining zone. Since these furnaces are, barring some malfunction, usually operated continuously, a pool of molten glass is always present and glass batch, i.e., the solid raw materials used to produce the glass, is added to the melt when the level drops below a selected point. Part of the added solid batch melts raising the level of the molten glass to that desired while the remaining solids, having a lower specific gravity than the melt, float on the surface forming a distinct layer. Both proceed downstream into the fining zone towards the discharge end of the furnace with the solids layer gradually melting. The layer of solid batch in the fining zone acts as an insulator adversely affecting the heat transfer characteristics between the molten glass and the high temperature atmosphere above the melt. This of course, detracts from the thermal efficiency of the process, but this floating layer of solid particles also inhibits the homogenization of the glass melt in the fining zone, prevents occluded gases from being released, and is responsible for the particulates exiting the fining zone with the melt, thus reducing the quality of the product. It will be understood by those skilled in the art that the production rate (or pull rate) is limited by the inability of the refining technique to facilitate removal of the occluded gases or particulates in the fining zone. Simply, the melt is required to remain in the furnace for a longer period of time until acceptable removal of gases and particulates is achieved.

DISCLOSURE OF THE INVENTION

An object of this invention, then, is to provide an improvement in a process for melting and refining glass whereby production rates are increased by bettering thermal efficiency, eliminating occluded gases and melting particulates in the melting zone, and improving homogeneity of the melt in the fining zone, and further, enhancing the quality of the product.

Other objects and advantages will become apparent hereinafter.

According to the present invention such an improvement has been discovered in a process for melting glass in a furnace adapted therefor, said furnace having an upstream melting zone and a downstream fining zone, wherein the molten glass travels along a path from the melting zone to the fining zone comprising:

(a) introducing solid glass batch into the melting zone;
(b) heating the batch whereby an upper layer of batch and a lower layer of molten glass are formed in the melting zone;
(c) providing sufficient heat to maintain the molten glass in the molten state through the fining zone;
(d) providing at least a part of the process heat through at least one oxygen/fuel flame located at each side of the path of the molten glass, said flames being fueled by an oxygen containing gas/fuel mixture wherein the oxygen containing gas contains about 50 percent to about 100 percent oxygen by volume; and
(e) withdrawing the molten glass from the fining zone.

The improvement comprises:
(i) providing the oxygen/fuel flames at low momentum;
(ii) directing the tip of each flame at the interface of the solid glass batch and the molten glass; and
(iii) covering substantially all of the width of the furnace with the flames in a narrow band about perpendicular to the path of the molten glass, said narrow band straddling the point at which the tips of the flames meet the interface in step (ii).

DETAILED DESCRIPTION

Figure 1:
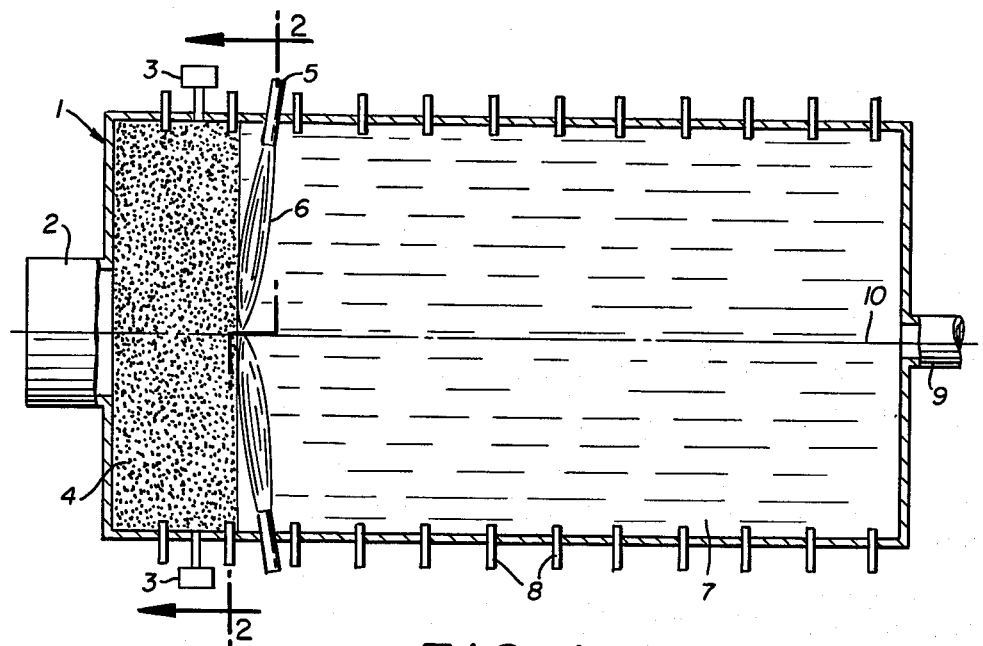
FIG. 1 is a schematic diagram of a plan view of a glass melting furnace in which the process of the invention can be carried out.
Figure 2:
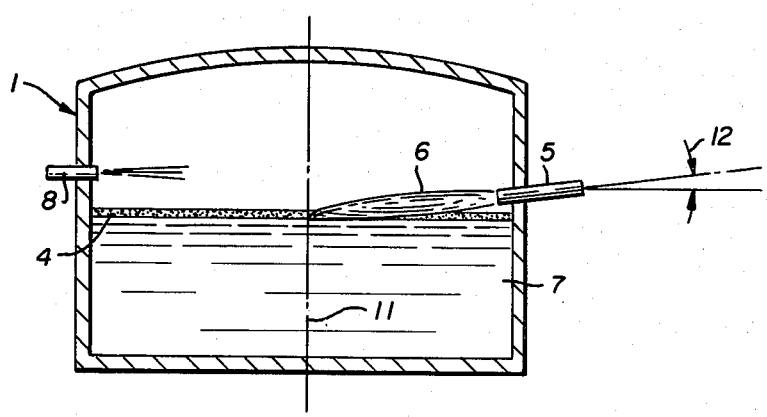
FIG. 2 is a schematic diagram of a cross-section taken at line 2—2 of FIG. 1. The perspective is one of looking upstream from the fining zone to the melting zone.

Rererring to the drawing:

Furnace 1 is a conventional glass melting and refining furnace having a carbon steel shell and a refractory lining. The refractory is about 1 to about 1.5 feet thick at the top of the furnace and about 1 to about 2 feet thick at the sidewalls and bottom. Alumina, chrome-magnesite, magnesia, silica, brick and other refractories may be used. Furnace 1 is provided with stack 2 through which effluent gases pass and with raw material feeders 3. Glass batch is introduced into melting zone 4 through feeders 3. It forms a layer of solid particles on the surface of the molten glass and then proceeds to gradually melt. The "batch" is a mixture of high temperature melting raw materials used in the manufacture of glass in proper proportions for introduction into the glass melting furnace. These raw materials often include scrap glass, which is referred to as cullet.

The glasses with which the subject process is mainly concerned are silicate glasses and the raw materials for these glasses include silica in major proportion, i.e., at least about 50 percent by weight and usually at least about 65 percent by weight silica. Other raw materials commonly used for making silicate glasses include: feldspar, limestone, dolomite, soda ash, potash, borax and alumina. Minor ingredients such as arsenic, antimony, sulfates, and fluorides are frequently added to alter the properties of the glass. In addition, other metal oxides are often added to obtain the desired color. Metallurgical slags and naturally occurring rock are used in the production of slag wool and rock wool. Generally, the materials are classified into three categories: (1) glass forming oxides, which include silica and boric oxide; (2) stabilizing oxides, which include aluminum oxide, calcium oxide, and magnesium oxide; and (3) fluxes such as sodium oxide, potassium oxide, and fining agents. Although commercial glasses are reported to contain about 55 to abut 94 percent glass formers, about 2 to about 30 percent stabilizers, and about 1.5 to about 22 percent fluxes, the common glasses used for windows and bottles contain about 70 to about 75 percent silica and about 12 to about 17 percent fluxes. Silica sand, another raw material, is almost pure silica and may contain one or more of the stabilizing oxides mentioned as an impurity.

Furnace 1 is maintained at a temperature in the range of about 1320° C. to about 1650° C. and is usually kept in the range of about 1320° C. to about 1450° C. The major proportion of the heat is provided by air/fuel burners 8 of which there may be from 4 to 30 symmetrically arranged on the side walls of the furnace. Thus, there are about 5 to 15 air/fuel burners 8 on each side of, and above, the path of molten glass. The function of the burners is to heat the atmosphere and furnace walls, which, in turn, heat the glass batch by convection and radiation and maintain the melt by convection. It is understandable, then, that a layer of solid particulates will interfere with the radiation of heat from the walls and reduce the thermal efficiency of the process. The air/fuel burners are generally located about 24 inches to about 60 inches above the solids/melt surface. The melt proceeds through fining zone 7 and is withdrawn at outlet 9.

In subject process, the transition of solid charge to liquid is effected as far upstream as possible by the use of at least one oxygen/fuel burner 5 on each side wall of the furnace. In some cases, the use of only one oxygen/fuel burner may be considered, however. Oxygen/fuel burners, more commonly referred to as oxy-fuel burners, are well known. They are designed to use a higher percentage of oxygen than is present in air and thus provide much higher flame temperatures. Generally, the oxygen in the oxygen containing gas/fuel mixture is at a level of about 50 percent to 100 percent by volume, and preferably about 80 to about 100 percent by volume. It will be understood that the term "oxygen containing gas" contemplates the presence of other gases such as nitrogen in admixture with the oxygen. These other gases may be present in amounts of about 1 percent of the oxygen containing gas to about 50 percent.

Center lines of furnace 1 are depicted as broken lines 10 and 11, respectively. In order to span the width of the furnace, the flame tips are directed to a point at about the center of furnace 1 with one further requirement, i.e., that the point be at the interface of the solid particulate layer and the melt. It will be understood that the flame tips do not have to be precisely on target and can vary from the point by as much as about one foot. The closer the flame tips are to the point the better, however. The high temperature of the flame melts the solids in its path and exposes the interface. A slight upstream angle is applied to be certain the flame tip and the interface coincide. The flame length is regulated so that the tip strikes the target, but is not deflected off the solids/melt surface against the walls of the furnace as this would accelerate refractory wear. Typically, burners 5 are located at the upstream end of the furnace at a point about 0.3 of the distance between the upstream wall or end and the downstream wall or end of furnace 1. The burner is positioned about 24 inches to about 36 inches above the solids/melt surface with a preferred angle of 18° to 45°, as measured downward from the horizontal located at end of the central axis of the burner. Angle 12 is shown, as measured upward from the horizontal, at the rear end of the burner. The same acute angle, of course, is present at the front end except that the direction is down instead of up, and this is the course the flame would follow. This angle, which may be referred to as the angle of impingement, brings the flame tips right on target. Further, the flames cover substantially the width of the furnace in a narrow band about 25 to about 40 inches wide and about perpendicular to center lines 10 and 11. The only portion of the width, which is not touched by the flames are the portions in the triangle formed by the flame, the side wall, and the solid/melt surface. This flame barrier, by melting substantially all of the solids in the narrow band, provides a demarcation between the melting zone and the fining zone through which very little solids escape except at the periphery. This is important because, as the furnace pullrate (the rate at which the melt moves through the furnace) is increased, there is a tendency for the solid particulates to expand into the fining zone. Burners 5 can be duplicated at six inch to one foot intervals to reduce the amount of solids escaping to the fining zone to an even greater extent. While one more set of oxy-fuel burners can be advantageous where higher purities are desired, more than two sets of these burners are not considered to be economically justifiable. Further, it is impractical and inefficient to direct too many sets of oxy-fuel burners at one target. Additional oxy-fuel burners can be positioned, however, in the roof or walls of the furnace further downstream to catch any of the solid batch escaping burners 5. While these additional (or auxiliary) burners will be low momentum flames, they will not, of course, meet the requirements of steps (ii) and (iii).

A preferred oxy-fuel burner for use in the process is an assembly of three concentric cylinders:
 (i) the outer cylinder is a waterjacket, which protects the burner from being overheated by the furnace atmosphere;
 (ii) the middle cylinder is an oxygen or oxygen containing gas supply line; and
 (iii) the inner or center cylinder is a supply line for a gaseous fuel.

The burner assembly is of sufficient length to protrude through the furnace wall and to allow for the connection of the several fluids passing through the burner, i.e., the water for the waterjacket, the gaseous fuel, and the oxygen containing gas.

There is a frontplate, which covers the end of the burner assembly protruding into the furnace. It has one large cylindrical orifice in the center, which orifice permits gaseous fuel to flow from the center cylinder, surrounded by eight smaller cylindrical orifices equidistant from each other and from the axis (running from end to end) of the center cylinder. These eight orifices open into the middle cylinder. Each of the axes (again, running from end to end of the cylinder) of these smaller cylindrical orifices is slanted at a 27° angle from the axis of the center cylinder so that the oxygen containing gas passes downward from the middle cylinder in the direction of the axis of the center cylinder to meet the gaseous fuel proceeding parallel to the axis of the center cylinder. The overall burner assembly is about 1500 millimeters in length and the diameter of the outer cylinder is about 115 millimeters. The thickness of the frontplate is about 12 millimeters, the large orifice is about 20 millimeters in diameter, and the smaller orifices are about 8 millimeters in diameter.

The orifices in the frontplate of the burner create a homogeneous mixture of gaseous fuel and oxygen thus obtaining a high temperature flame. By varying the diameter and length of the frontplate orifices and the angle of the axes of the smaller orifices to that of the axis of the large center orifice different flame lengths, accommodating different furnace dimensions, are obtained. Further, the frontplate permits the gaseous fuel to burn with more or less oxygen than required for complete combustion. Consequently, if it is desired for reasons of glass quality, a reducing or oxidizing flow may be obtained without affecting the shape of the flame.

The point at which the tips of the flames are directed can also be characterized as the coldest point of the interface. This point generally coincides with the point on center lines 10 and 11 noted above. It is found that targeting the oxy-fuel flame at the intersection of center lines 10 and 11 and the interface or at the coldest spot on the interface increases the melting rate of the solid batch and causes local overheating such that the fining zone is increased and degassing, i.e., the release of occluded gases, is improved. It is particularly advantageous that the occluded gases be released in the melting zone because these gases detract from the high degree of homogeneity sought in the fining zone. Examples of occluded gases are carbon dioxide, water vapor and nitrogen. The escape of these gases is considered to be the result of a reduction in viscosity of the melt at the interface.

While the low momentum flames assist in obtaining these advantages, they also are responsible for minimizing the dusting of the solid particulates, which, if projected onto the walls of the furnace, decrease refractory life. Flame velocities which can be used in subject process are in the range of about 30 to about 100 meters per second and are preferably in the range of about 50 to about 70 meters per second.

It will be appreciated that the narrow band of flame across the width of the furnace, about perpendicular to the flow of the melt or center lines 10 and 11, substantially avoids, even at high pullrates, the breakthrough of unmelted solid particulates into the fining zone.

In some cases, forced circulation of the melt is undertaken by bubbling air through the melt. This feature is advantageously provided in the area where transition from the melting zone to fining zone is desired. The colder liquid rises in the bubble zone to provide the coldest point of the interface and the flames can be directed at this point.

It is found that the application of subject process to conventional glass melting and refining furnaces increases the production rate by at least 25 percent; increases the fining zone by 10 to 20 percent; reduces particulatea in the product; improves homogeneity, degassing, and efficiency; and enhances temperature control. The increase in production rate (pullrate), of course, means that less energy is used to produce the same amount of glass.

I claim:

1. In a process for melting glass in a furnace adapted therefor, said furnace having an upstream melting zone and a downstream fining zone, wherein the molten glass travels along a path from the melting zone to the fining zone comprising:
    (a) introducing solid glass batch into the melting zone;
    (b) heating the batch whereby an upper layer of batch and a lower layer of molten glass are formed in the melting zone;
    (c) providing sufficient heat to maintain the molten glass in the molten state through the fining zone;
    (d) providing at least a part of the process heat through at least one oxygen/fuel flame located at each side of the path of the molten glass, said flames being fueled by an oxygen containing gas/fuel mixture wherein the oxygen containing gas contains about 50 percent to about 100 percent oxygen by volume; and
    (e) withdrawing the molten glass from the fining zone,
the improvement comprising:
    (i) providing the oxygen/fuel flames at a velocity of about 30 to about 100 meters per second;
    (ii) directing the tip of each flame at the interface of the solid glass batch and the molten glass whereby the tips meet the interface; and
    (iii) covering substantially all of the width of the furnace with the flames in a narrow band about perpendicular to the path of the molten glass, said narrow band straddling the point at which the tips of the flames meet the interface in step (ii).

2. The process defined in claim 1 wherein the tip of each flame is directed to about the intersection of the center of the furnace and the interface.

3. The process defined in claim 1 wherein the tip of each flame is directed to about the coldest point on the interface.

* * * * *

UNITED STATES PATENT AND TRADEMARK OFFICE
CERTIFICATE OF CORRECTION

PATENT NO. : 4,473,388
DATED : September 25, 1984
INVENTOR(S) : Eddy J. Lauwers

It is certified that error appears in the above—identified patent and that said Letters Patent is hereby corrected as shown below:

On the title page, Assignee,

"Union Carbide Corporation" to --Union Carbide Benelux N.V., Antwerp, Belgium--.

Signed and Sealed this

Twenty-third Day of April 1985

[SEAL]

Attest:

DONALD J. QUIGG

Attesting Officer     Acting Commissioner of Patents and Trademarks